United States Patent [19]

Kurokawa et al.

[11] Patent Number: 4,793,056
[45] Date of Patent: Dec. 27, 1988

[54] PLUG REMOVAL APPARATUS

[75] Inventors: Hideyuki Kurokawa; Shoichi Hamada; Makoto Ohta, all of Kobe, Japan

[73] Assignee: Mitsubishi Jukogyo Kabushiki Kaisha, Tokyo, Japan

[21] Appl. No.: 40,472

[22] Filed: Apr. 20, 1987

[30] Foreign Application Priority Data

Apr. 25, 1986 [JP] Japan .................................. 61-94932
Apr. 25, 1986 [JP] Japan ............................. 61-61638[U]

[51] Int. Cl.$^4$ ............................................. B23P 15/26
[52] U.S. Cl. ....................................... 29/726; 29/234; 29/426.5; 138/89; 138/97; 138/98; 165/11.2; 376/260
[58] Field of Search ............... 29/234, 252, 263, 264, 29/402.01, 402.03, 426.5, 726, 727; 138/89, 97, 98; 165/11.2, 76; 376/260

[56] References Cited

U.S. PATENT DOCUMENTS

| | | |
|---|---|---|
| 2,807,079 | 9/1957 | Josephson . |
| 3,504,420 | 4/1970 | Shores . |
| 4,366,617 | 1/1983 | Nanstiel et al. ................... 29/727 |
| 4,406,856 | 9/1983 | Wilkins et al. ................. 29/727 X |
| 4,438,805 | 3/1984 | Gugel .......................... 29/402.01 X |
| 4,597,294 | 7/1986 | Brill, III et al. ............... 370/260 X |
| 4,639,994 | 2/1987 | Cooper, Jr. et al. ............ 29/402.01 |
| 4,696,102 | 9/1987 | Overbay .............................. 29/726 |

FOREIGN PATENT DOCUMENTS 139494 5/1985 European Pat. Off. ......... 20/402.01

*Primary Examiner*—P. W. Echols
*Assistant Examiner*—Andrew E. Rawlins
*Attorney, Agent, or Firm*—Wenderoth, Lind & Ponack

[57] ABSTRACT

A plug removal apparatus for removing a mechanical plug fixed in an end of each heat exchange tube of a heat exchanger includes a plug removing mechanism which engages with and pulls out a cylindrical member of the mechanical plug. The plug removing mechanism includes a mandrel insertable into and threadedly engageable with the cylindrical member, a push rod coaxially extending through the mandrel for pushing a cone member of the mechanical plug, an actuating means for selectively moving the mandrel and the push rod towards and from the mechanical plug, and a drive means for selectively rotating the mandrel into engagement with the cylindrical member.

5 Claims, 7 Drawing Sheets

FIG. 13.
FIG. 14.
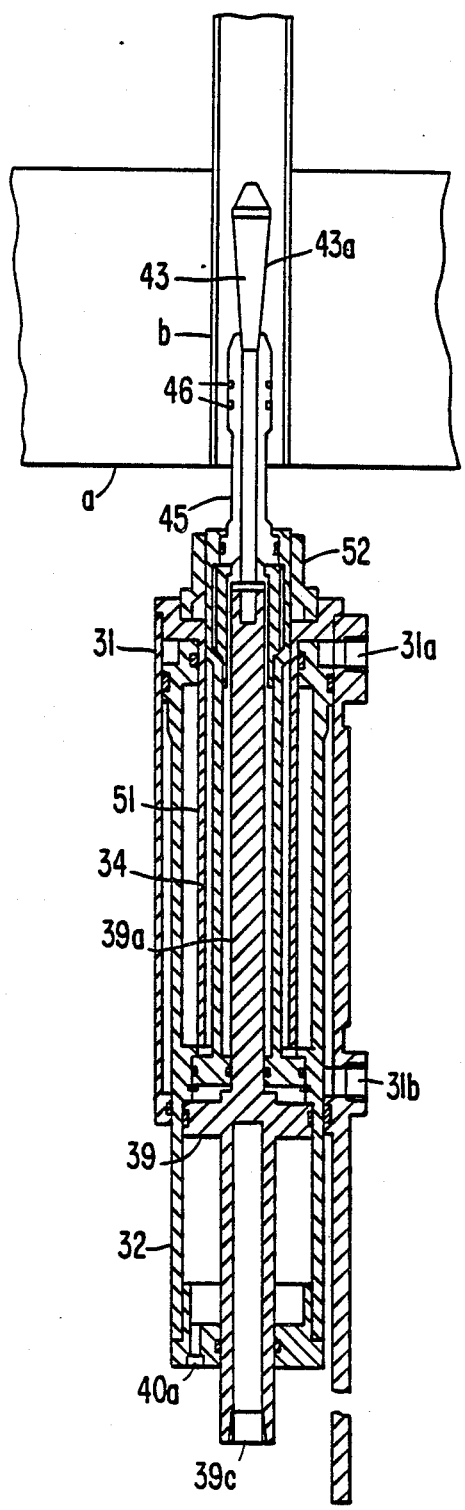
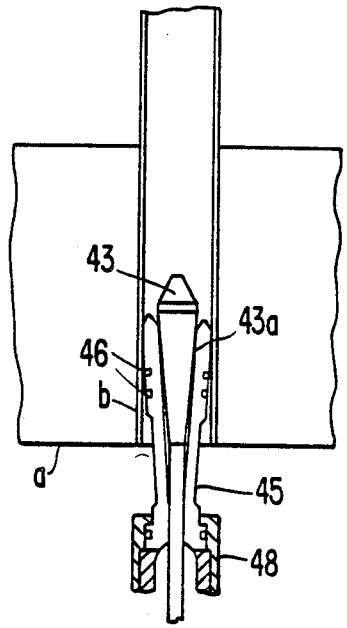

PLUG REMOVAL APPARATUS

BACKGROUND OF THE INVENTION

1. Field of the Invention

This invention relates to a plug removal apparatus and, more particularly, to a remotely operatable apparatus for removing plugs from plugged heat exchanger tubes.

2. Description of the Prior Art

In tube type heat exchangers, a first fluid flows through the tubes of the heat exchanger while a second fluid surrounds the outside of the tubes such that heat exchange occurs between the two fluids. Occasionally, one of the tube becomes defective and a leak occurs therein which allows the two fluids to mix. When a leak occurs, it is necessary to plug the tube so that the fluid does not flow through the tube thereby preventing leakage from the tube.

Nuclear power plants, typically pressurized water reactor power plants, include tube type heat exchangers commonly referred to as steam generators.

When a defect occurs in the tubes of the nuclear steam generator that allows the reactor coolant in the tubes to enter the feed water outside of the tubes, a more significant problem arises. Namely, the leakage creates a radioactive contamination problem. Since the coolant in the tubes of a nuclear steam generator is generally radioactive, it is important that the collant be prevented from leaking from the tubes and contaminating the fluid surrounding the tubes. Therefore, when a leak occurs in a nuclear steam generator heat exchange tube, the heat exchange tube is plugged so that the collant is not permitted to flow through the tube. This prevents contamination of the fluid surrounding the tubes.

One device used to plug heat exchange tubes is generally referred to as a mechanical plug. The mechanical plug comprises a cylindrical member closed at one end and having a tapered inner bore. A cone member is disposed in the cylindrical member such that when the cone member is drawn along the longitudinal axis of the cylindrical member, the cylindrical member is forced into close contact with the heat exchange tube due to the relative tapers of the inner surface of the cylindrical member and the cone member. This type of plug has the characteristic of being able to be removed without being drilled out. In order to remove the mechanical plug, it is, thus, first desirable to relieve the internal pressure on the plug by moving the cone member to a position in the plug in which the tapered diameters of the plug and cone member are not in contact. Next, with the pressure on the plug relieved, the plug may then be pulled from the heat exchange tube.

Of course, the plugging of heat exchange tubes occurs when the plugged tubes have become out of service. An increased number of plugged tubes results in a decreased heat exchange capacity of the heat exchanger. Therefore, it becomes necessary to remove a plug so that the plug or the associated tube can be replaced or repaired.

Such a plug removal operation is normally performed in a somewhat radioactive environment, since such plugs are usually installed in nuclear steam generators.

The operation in the radioactive environment should preferably be accomplished within a short time from the standpoint of preserving a worker's health (to meet the limitation of radiation exposure), otherwise, a long-time operation requires a number of workers.

Published European Patent No. 35911 (Japanese Patent Laid-Open No. 56-146682, U.S. Pat. No. 4,366,617) discloses an apparatus suited to achieve the pull-out and removal operation of plugs within a short time.

This prior apparatus employs a pull-out rod threadedly engageable with an open end inner surface of a plug and a fluid actuator for pushing a cone member and pulling out the plug from a heat exchange tube. These components are assembled into a single unit and can shorten the removal operation as compared with the case of using simple hand tools. However, even if this prior apparatus is used, a worker has to stand in the radioactive environment over the course of the entire operation of coupling (threadedly engaging) the pull-out rod with the plug and perform such operation. Hence, the effect of reducing the amount of radiation exposure is not enhanced.

One conventional plug removal apparatus practically used in the plug removal operation is shown in FIG. 1. Reference symbol a designates a tube plate, and b designates a heat exchange tube (provided in a hole boared in the tube plate a). The tube plate a has a number of heat exchange tubes b arranged in regular order and attached at each end thereto.

Reference symbol c designates a plug for blocking up an end portion of the heat exchange tube b, d designates a cone member for causing the plug c to contact the inner peripheral surface of the heat exchange tube b tightly through wedge action, e designates a plug removal apparatus, f designates a cone member push rod, g designates a mandrel, h designates a plug pull-out cylinder, i designates a plug pull-out piston, j designates a cylinder for moving the cone member push rod, k designates a piston for moving the cone member push rod, l designates a handle for turning the cone member push rod, and m designates a gauge indicative of the extent of travel of the cone member.

A worker brings the plug removal apparatus e into a water room of a steam generator, positions the plug removal apparatus e directly under the plug c, and turns the mandrel turning handle l by hand to cause the threaded point of the mandrel g to engage threadedly with a threaded portion $c_1$ provided on the inner peripheral surface of the plug c.

Then, the inside of the cylinder j for moving the cone member push rod is pressurized to move both the piston k for moving the cone member push rod and the cone member push rod f so that the cone member d is pushed into the inner part of the plug c. Because the cone member d maintaining the plug c tightly in contact with the inner peripheral surface of the heat exchange tube b through wedge action is pushed into the inner part of the plug c, it becomes possible to pull out the plug c from inside the heat exchange tube b.

At this moment, the worker confirms through the gauge m indicative of the extent of travel of the cone member as to whether or not the cone member d has been pushed. If the cone member d has completely been pushed, the inside of the plug pull-out cylinder h is pressurized to move the plug pull-out piston i (to move the mandrel g), thereby pulling the plug c out. The plug c pulled out, together with the plug removal apparatus e, is brought out from the water room by the worker, detached from the mandrel f, and thrown away.

As described above, the cylinder operation carried out comprises the two steps of pressurizing the inside of the cylinder j for moving up the cone member push rod and pressurizing the plug pull-out cylinder h, and all steps are performed manually.

That is, when the foregoing conventional apparatus is used the worker must enter the water room under the radioactive environment, and hold and control the apparatus while working. Hence, the same problem as of the prior apparatus still remains.

Furthermore, both apparatuses described above have the problem of making it impossible to drive in the mandrel g at the time of pull-out because of collapse, misalignment, and the like of the threaded portion of the plug c that would occur when the plug c is attached to the heat exchange tube b.

SUMMARY OF THE INVENTION

It is an object of the present invention to provide an improved plug removal apparatus free from foregoing problem.

To achieve the foregoing object, the present invention provides a plug removal apparatus for removing a mechanical plug fixed in an end of a heat exchange tube used in a heat exchanger. The apparatus of the present invention comprises a plug removing mechanism which engages with and pulls out a cylindrical member of the mechanical plug and at least two body clamping mechanisms.

The plug removing mechanism comprises a mandrel insertable into and threadedly engageable with the cylindrical member, a push rod coaxially extending through the mandrel for pushing a cone member of the mechanical plug, an actuating means for selectively moving the mandrel and the push rod toward and away from the mechanical plug, and a drive means for selectively rotating the mandrel into engagement with the cylindrical member.

BRIEF DESCRIPTION OF THE DRAWINGS

FIG. 13 is a view similar to FIG. 11 showing the operating state; and

FIG. 14 is a partial view corresponding to FIG. 13 showing the clamping state.

DESCRIPTION OF THE PREFERRED EMBODIMENT

Figure 2:
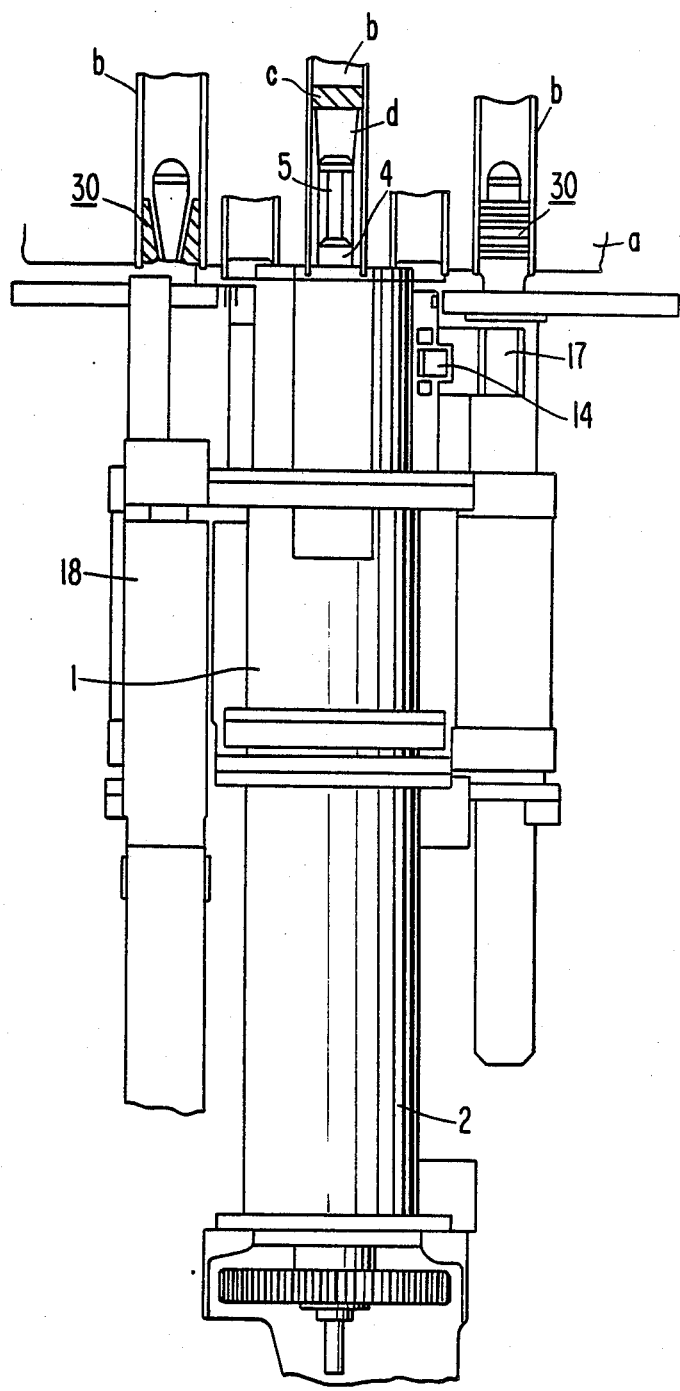
FIG. 2 is a side view of an embodiment of a plug removal apparatus according to the present invention.
Figure 3:
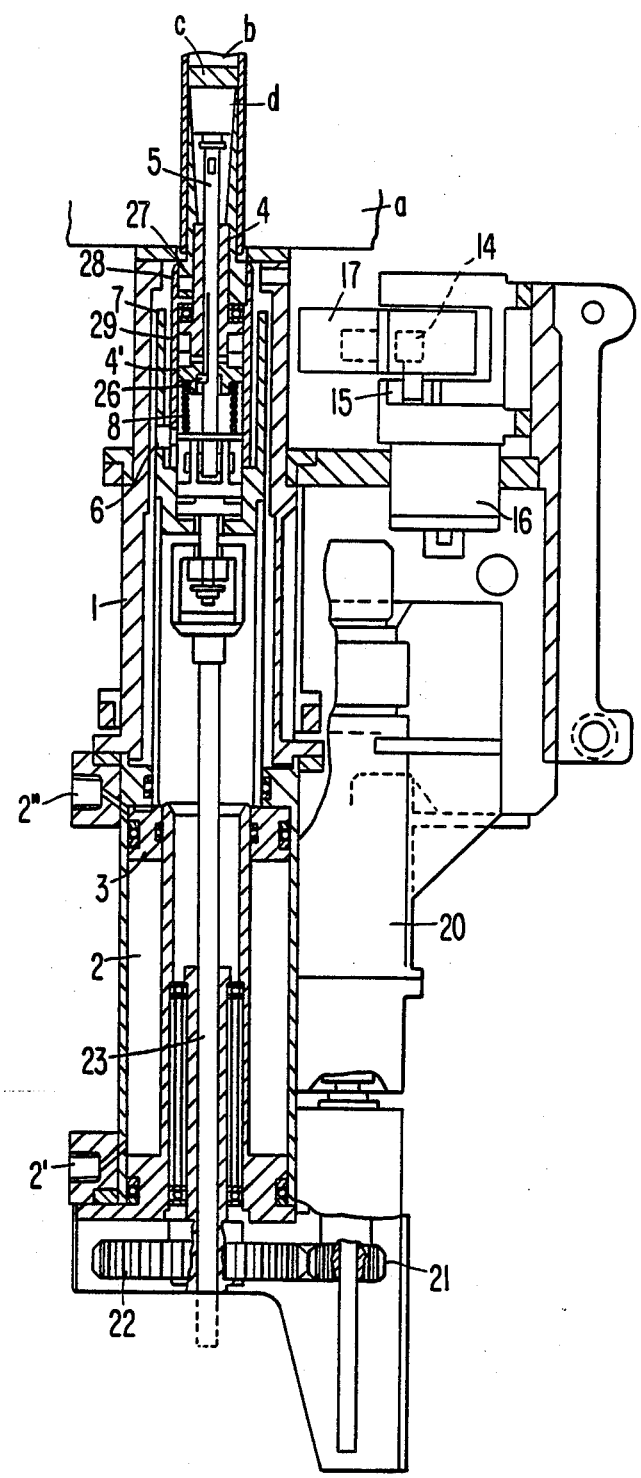
FIG. 3 is a vertical sectional side view corresponding to FIG. 2, as viewed from a different side.

An embodiment of a plug removal apparatus according to the present invention will now be described with reference to FIGS. 2 through 10. In FIGS. 2 and 3, reference numeral 1 designates a plug removal apparatus, 2 designates a cylinder formed with a lower port 2' and an upper port 2'', 3 designates a piston, and 4 designates a mandrel having a vertical through hole bored therein.

Reference numeral 4' in FIGS. 3 through 7 designates a torque limiting clutch which is characteristic of the present invention. This torque limiting clutch 4' is attached to a cone member push rod 5 (hereinafter described) movably only in the axial direction, and formed on its upper side with teeth associated with radial teeth formed on the lower end surface of the mandrel 4. The mandrel 4 is vertically movable within the extent of a groove (not shown) of a trigger member 7 by means of a pin 6 provided to a member attached to the mandrel 4.

Reference numeral 5 designates the cone member push rod slidably inserted in the vertical hole of the mandrel 4. A compression spring 8 is interposed between a flange portion provided at a lower end portion of the cone member push rod 5 and the torque limiting clutch 4'. The torque limiting clutch 4' is urged upwardly by the compression spring 8, and the teeth of the torque limiting clutch 4' mesh with the teeth provided on the lower end surface of the mandrel 4. The mandrel 4 is also urged upwardly by the compression spring 8 and the torque limiting clutch 4', so that the pin 6 attached to a fixture 29 coupled via a pin 28 with a presser member 27 on the mandrel 4 abuts the upper edge of the aforementioned groove. The trigger member 7 is screwed into a member associated with the piston 3 so that it can move up and down together with the piston 3.

Figure 1:
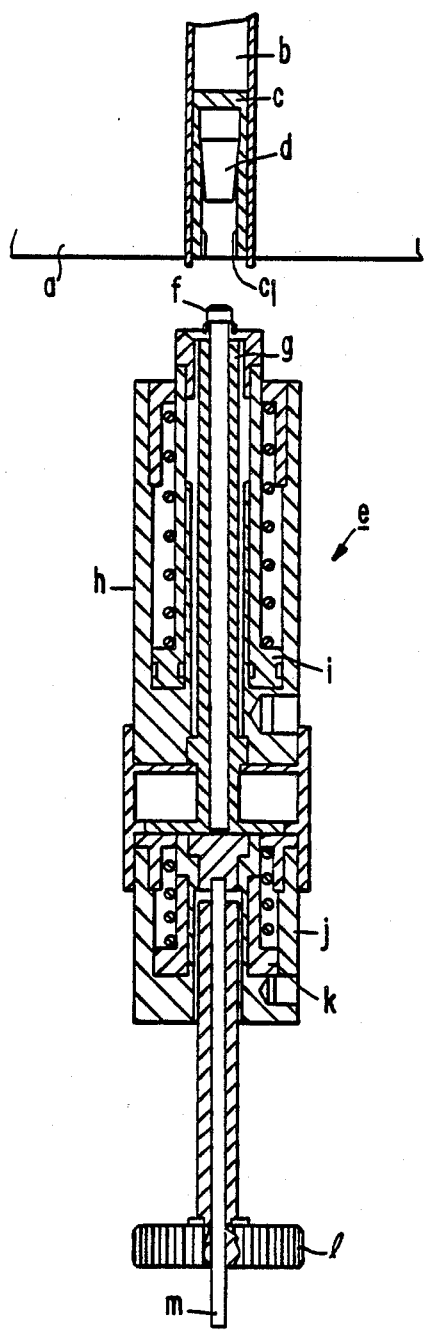
FIG. 1 is a vertical sectional side view of a conventional plug removal apparatus.
Figure 4:
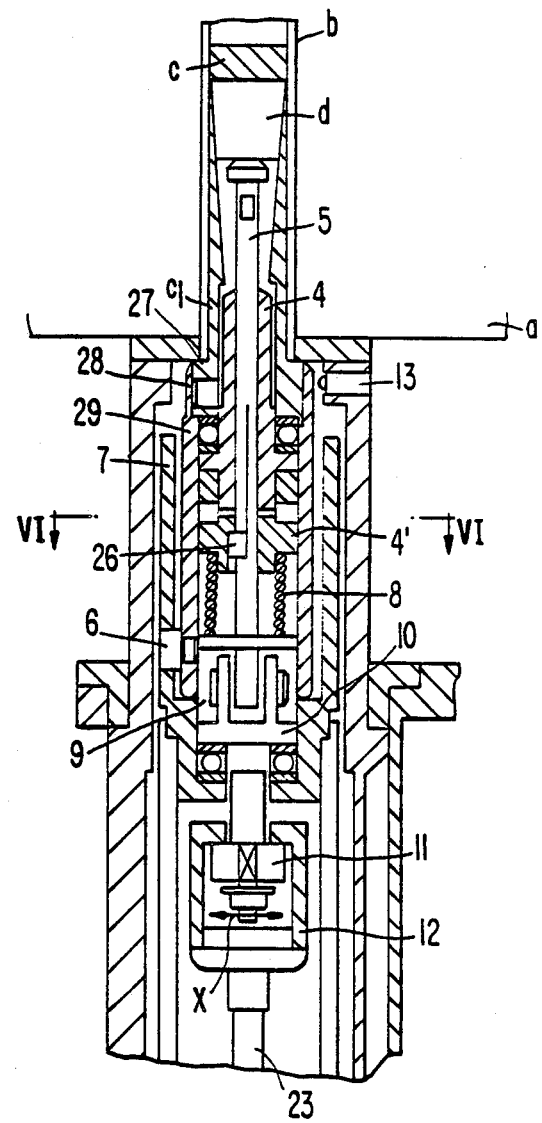
FIG. 4 is an enlarged view of an aligning universal joint section shown in FIG. 3.
Figure 5:
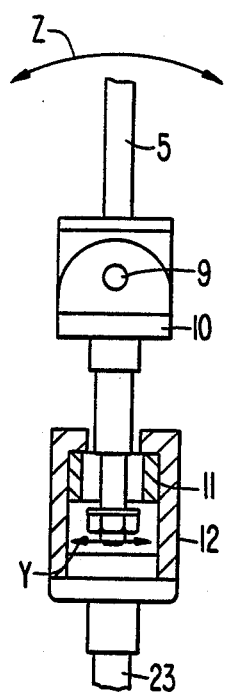
FIG. 5 is a partial view corresponding to FIG. 4, as viewed from a different side.
Figure 6:
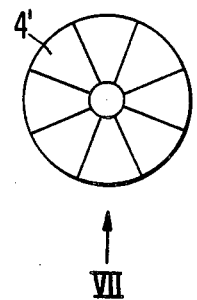
FIG. 6 is a plan view of a torque limiting clutch, as taken along line VI—VI of FIG. 4.
Figure 7:
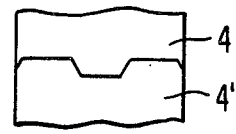
FIG. 7 is a side view of the torque limiting clutch, as taken in the direction of arrow VII of FIG. 6.

As shown in FIGS. 4 and 5, the lower end of the cone member push rod 5 passing through the mandrel 4 is pivotably coupled in the direction of the arrow Z via a pin 9 with a joint member (an aligning universal joint) 10. The lower end of the joint member 10 in turn is movably coupled in the direction of the arrow Y with a joint member (an aligning universal joint) 11, and the joint member 11 in turn is movably coupled in the direction of the arrow X with a joint member (an aligning universal joint) 12.

In FIGS. 2, 3, 8, 9 and 10, reference numeral 14 designates a push bar, 15 designates a cam for advancing/retracting the push bar 14, 16 designates an actuator, and 17 designates an arm.

Figure 8:
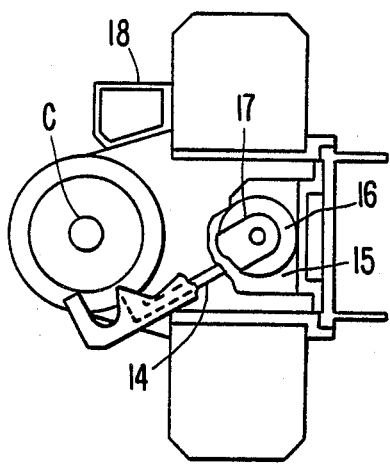
FIGS. 8, 9 and 10 are diagrams explanatory of the operation of a plug collecting mechanism.
Figure 9:
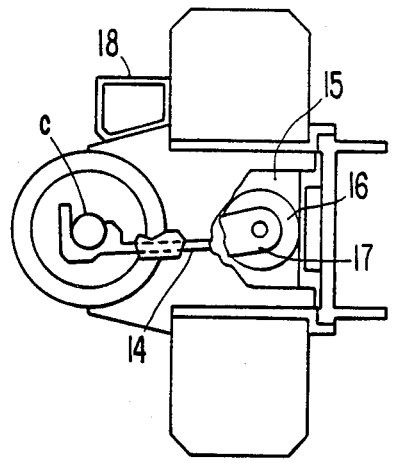
Figure 10:
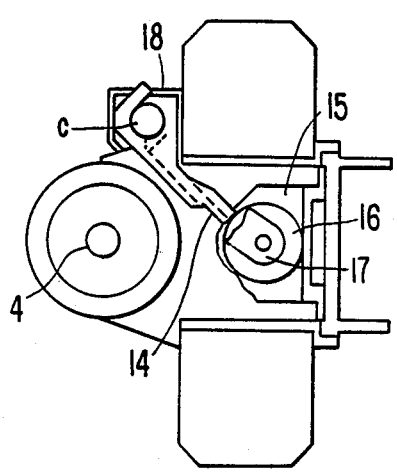

FIG. 8 shows a state in which push bar 14 is pushed against a root portion of the cam 15 by a spring force so that a gripper section is open. FIG. 9 shows a state in which the arm 17 is swung by the actuator 16 to catch the plug c pulled out and the push bar 14 is pushed outward to grip the plug c. As the mandrel 4 is rotated to come out of engagement with a threaded portion $c_1$ (see FIG. 4) of the plug c, the arm 17 and the push bar 14 are swung up to a position above a receiving container 18 as shown in FIG. 10. Thus, the push bar 14 comes into contact with the root portion of the cam 15, the gripper section is opened, and the plug c is released, so that the released plug falls into the receiving container 18, thereby being collected.

In FIG. 3, reference numeral 20 designates a motor for rotating the mandrel, 21 designates a gear driven by the motor 20, and 22 designates meshing with the gear 21. In FIGS. 3, 4 and 5, reference numeral 23 designates a rotor shaft fitted in a shaft hole of the gear 22 and movable only in the axial direction. The rotation of the motor 20 is transmitted via gear 21, gear 22, rotor shaft 23, joint members (universal joints) 12, 11 and 10, cone member push rod 5, sliding key 26, and torque limiting clutch 4' to the mandrel 4. As a result, the mandrel 4 is rotated.

FIG. 2 shows clamp mechanisms 30. Specifically, the plug removal apparatus 1 includes at least one pair of clamp mechanisms 30 disposed. As to either side the aforementioned mandrel 4, cone member push rod 5, etc. Each clamp mechanism 30 is coupled with each heat exchange tube b having no plug therein such that the plug removal apparatus 1 is detachably fixed to the tube plate a.

An example of the clamp mechanism 30 will now be described with reference to FIGS. 11 through 14.

Figure 11:
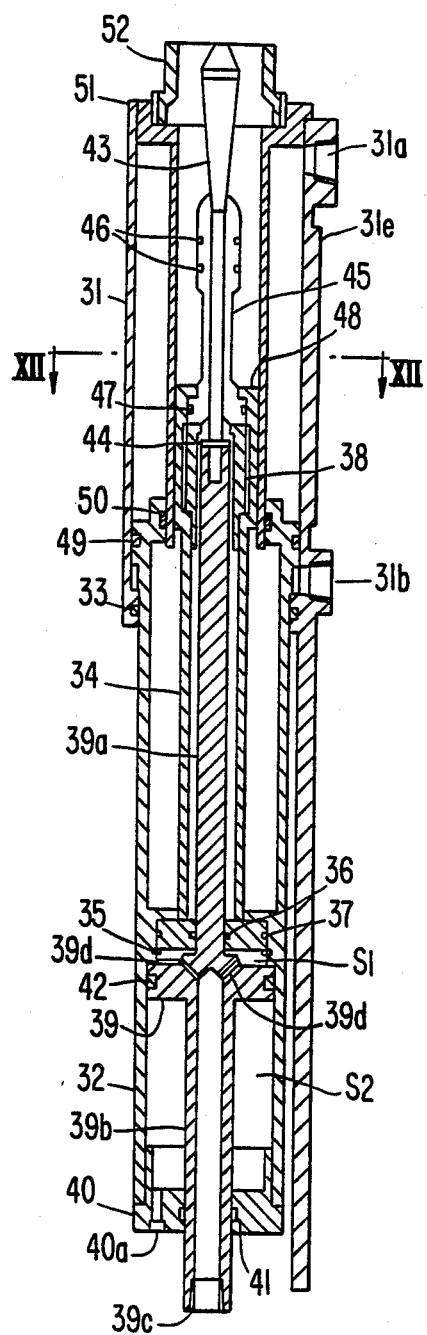
FIG. 11 is a vertical sectional side view of a clamp mechanism.
Figure 12:
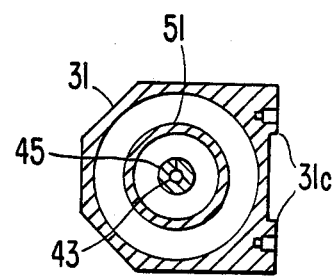
FIG. 12 is a sectional view taken along line XII—XII of FIG. 11.

In FIG. 11, reference numeral 31 designates a lifting cylinder in which a vertically slidable clamping cylinder 32 is inserted from below, these two cylinders 31 and 32 making up a double cylinder structure. The lifting cylinder 31 has a sectional shape as shown in FIG. 12 and holds an O-ring 33 fitted on the inner peripheral surface of its lower portion. A side wall of the lifting cylinder 31 has fluid inlet/outlet ports 31a and 31b in its upper and lower portions and a seat 31c on its side surface for attachment of the clamp mechanism to a mount (not shown) by the use of studs.

On the other hand, the clamping cylinder 32 has a cylindrical guide 34 disposed therein above a central portion thereof, this guide being fixed by a snap ring 35 and sealed by O-rings 36 and 37. A screw member 38 is screwed into the upper end of the guide 34. The clamping cylinder 32 has also a vertically slidable piston 39 disposed therein below the guide 34 and an O-ring 42 for facilitating airtightness. The piston 39 has piston rods 39a and 39b extending upward and downward integrally therefrom. The piston rod 39b is hollow and has a fluid inlet/outlet port 39c at its lower end. The lower end of the clamping cylinder 32 is blocked by a head cover 40, which is formed with a fluid inlet port 40a and has an O-ring 41 fitted on the inner peripheral surface thereof.

A lower section below the guide 34 of the inside of the clamping cylinder 32 is partitioned by the piston 39 into an upper chamber $S_1$ and a lower chamber $S_2$, the upper chamber $S_1$ having through holes 39d which communicate with the fluid inlet/outlet port 39c of the piston rod 39b.

The piston rod 39a passes through a lower end flange portion of the guide 34 and extends upward. Into the upper end of this piston rod is screwed a button 43 moving a tapered portion 43a. This button 43 is prevented from rotating by means of a nut 44. Around the outer periphery of the button 43 is provided a three-piece divided cotter 43 surrounded by O-rings 46 and 47, whose movement in the axial direction is restricted by a cap nut 48.

The foregoing clamp mechanism is assembled by inserting the clamping cylinder 32 with the O-rings 49 and 50 attached around its upper portion from below into the lifting cylinder 31, fitting a sleeve 51 on an upper end portion of the guide 34, fixing the upper end of the sleeve 51 to the lifting cylinder 31, and screwing a reinforcing member 52 into the sleeve 51.

The operation of the plug removal apparatus will now be described in greater detail. The plug removal apparatus 1 is brought into the water room of the steam generator by a guide device (not shown), its mandrel 4 is positioned immediately below the plug c to be pulled out, and the plug removal apparatus is fixed to the tube plate a by the clamp mechanism 30.

Specifically, the clamp mechanism is brought close to the tube plate a, and the axis of the heat exchange tube b is aligned with that of the button 43. Then, as a pressurized fluid is supplied through the fluid inlet/outlet port 31b into the lifting cylinder 31, the upper section of the clamping cylinder 32 functions as a piston. Hence, the clamping cylinder 32 is pushed up. At the same time, the guide 34, together with the piston rod 39a, is moved up while being guided by the sleeve 51. As a result, the button 43 and the cotter 45 are inserted into the heat exchange tube b as shown in FIG. 13.

Thereafter, as the pressurized fluid is supplied through the fluid inlet port 39c, the pressurized fluid passes through the piston rod 39b and the through holes 39d, flows into the upper chamber $S_1$, and acts on the upper surface of the piston 39, so that the piston 39 is moved down. Due to the downward movement of the piston 39, the button 43 is moved down while the position of the cotter 45 is kept unchanged, as sown in FIG. 14. Consequently, an upper portion of the cotter 45 is forced outwardly by the tapered portion 43a of the button 43 and its peripheral rough surface contacts the inner peripheral surface of the heat exchange tube b. Hence, the clamp mechanism is rigidly clamped via the heat exchange tube b to the tube plate a.

Furthermore, as the pressurized fluid is supplied through the fluid inlet port 31a into the lifting cylinder 31, the lifting cylinder 31 is pushed up and the reinforcing member 52 is pushed against the under side of the tube plate a. Therefore, the plug removal apparatus 1 secured via a member (not shown) to the lifting cylinder 31 is also pulled up. In this way, the plug removal apparatus 1 is moved up and its upper side is made to contact with the tube plate a.

Then, the inside of the cylinder 2 is pressurized through the lower port 2' to move the piston 3, trigger member 7, joint member 10, compression spring 8, torque limiting clutch 4', and mandrel 4 up, so that the upper end portion of the mandrel 4 is pressed against the threaded portion $c_1$ of the plug c. During this operation, the joint members (aligning universal joints) 12, 11 and 10 rock and shift in the directions of the arrows X, Y and Z, the upper end portion of the mandrel 4 becomes coaxial with the plug c, and the pin 6 abuts the upper edge of the groove of the trigger member 7.

Then, the motor 20 is energized. As a result, the rotation of the motor is transmitted via the gear 21, gear 22, rotor shaft 23, joint members (aligning universal joints) 12, 11 and 10, cone member push rod 5, sliding key 26, and torque limiting clutch 4' to the mandrel 4. Consequently, the mandrel 4 is rotated and screwed into the threaded portion $c_1$ of the plug c. Before long, the screwing action is completed and the rotation of the mandrel 4 stops. However, because the rotary/drive system of the mandrel 4 still continues to rotate, a load larger than a preset screwing load is then imposed on the mandrel 4 and the threaded portion $c_1$ of the plug c. As this condition is brought about, the contact surface of the torque limiting clutch 4' begins to slide and the mandrel 4 stops, hence, seizure between the mandrel 4 and the threaded portion $c_1$ of the plug is prevented from occurring.

Then, the inside of the cylinder 2 is pressurized again through the lower port 2' to move the piston 3, trigger member 7, and cone member push rod 5 up until the pin 6 abuts on the lower edge of the groove of the trigger member 7. As a result, the cone member d is pushed into the inner part of the plug c and the plug c becomes able to be pulled out. Then, the inside of the cylinder 2 is pressurized through the upper port 2" to move the piston 3 and the trigger member 7 down and to cause the pin 6 to abut on the upper edge of the groove of the trigger member 7. Thus, the mandrel 4, together with the presser member 27 and fixture 29, is moved down to pull the plug c out of the heat exchange tube b so that the plug can be collected by the plug removal apparatus 1. Then, the plug removal apparatus 1 is lowered until the plug c is exposed. Thereafter, the arm 17 is swung by the actuator 16 to catch the plug c pulled out, the push bar 14 is pushed outward to grip the plug c, the mandrel 4 is rotated to come out of engagement with the threaded portion $c_1$ of the plug c, and the arm 17 and push bar 14 are swung up to a position above the receiving container 18. At this moment, the push bar 14 comes to contact with the root portion of the cam 15 to open the gripper section, so that the plug c is released to fall into the receiving container 18, thereby being collected. As the object plug c is collected, the clamp mechanism 30 is released, the apparatus is moved by the guide device to the position of the next plug to be removed, and fixed again by the clamp mechanism at a position immediately below the next plug.

The release of the clamp mechanism 30 is accomplished in the manner described below. That is, as the pressurized fluid is supplied through the fluid inlet/outlet port 40a into the lower chamber $S_2$ to push up the piston 39 having been pushed down in the clamping cylinder, the button 43 is moved up as shown in FIG. 13 and the cotter 45 is forced inwardly by the O-rings 46 so that clamp action is removed. Thereafter, the clamp mechanism is separated from the heat exchange tube b through a reverse operation of the aforementioned operation.

What is claimed is:

1. An apparatus for removing a mechanical plug including a cone member disposed within a threaded cylindrical member from a heat exchange tube extending in a plate in which a plurality of such heat exchange tubes extend, said apparatus comprising:
   a plug removing mechanism for removing the plug, said mechanism including a mandrel insertable into the cylindrical member of the plug, said mandrel having a threaded portion for threadedly engaging the threaded cylindrical member,
   a push rod extending coaxially through said mandrel for pushing the cone member of the plug within the cylindrical member,
   an actuating means operatively connected to said mandrel and/or such push rod for moving said mandrel and/or said push rod toward or away from the plug, and
   drive means operatively connected to said mandrel for selectively rotating said mandrel into threaded engagement with the plug,
   said drive means including a drive motor, a gear train operatively connected to said motor so as to be driven thereby, a rotor shaft extending through said actuating means and connected to said gear train, and a torque limiting clutch operatively connected between said motor and said mandrel for limiting torque imparted to said mandrel through said drive means to a preset screwing torque.

2. An apparatus according to claim 1,
   and further comprising at leat two holding devices integrally connected to said plug removing mechanism,
   said two holding devices having respective clamping means insertable into respective ones of the plurality of heat exchange tubes that are adjacent a plugged heat exchange tube for clamping the apparatus to the plate in which the heat exchange tubes extend.

3. An apparatus according to claim 1, wherein said drive means further includes a universal joint connected to said push rod.

4. An apparatus according to claim 1, and further including a plug collecting means integrally connected to said plug removing mechanism for collecting the plug removed by the plug removing mechanism.

5. An apparatus according to claim 4, wherein said plug collecting means comprises a rotating actuator, a swing arm, a gripper slidably mounted on said swing arm, and a receiving container.

* * * * *